United States Patent
Kounlavong et al.

(10) Patent No.: US 9,241,592 B2
(45) Date of Patent: Jan. 26, 2016

(54) SLOW COOKER WITH THERMOMETER FOR INDICATING A TEMPERATURE CONDITION OF THE FOOD IN THE COOKING VESSEL

(71) Applicant: Sunbeam Products, Inc., Boca Raton, FL (US)

(72) Inventors: Phetsouvanh Kounlavong, Lake Worth, FL (US); Monte Davis, Boynton Beach, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 272 days.

(21) Appl. No.: 13/764,334

(22) Filed: Feb. 11, 2013

(65) Prior Publication Data

US 2014/0227401 A1    Aug. 14, 2014

(51) Int. Cl.
*A47J 27/09* (2006.01)
*A47J 31/56* (2006.01)

(52) U.S. Cl.
CPC .. *A47J 27/09* (2013.01); *A47J 31/56* (2013.01)

(58) Field of Classification Search
CPC ........ A01B 12/006; A47J 27/09; A47J 31/56; A47J 37/06; G01K 2207/00; G01K 2207/02; G01K 2207/04; G01K 2207/06; G01K 2207/08
USPC ........... 426/231; 219/441, 432, 433, 435, 492
See application file for complete search history.

(56) References Cited

U.S. PATENT DOCUMENTS

| | | | |
|---|---|---|---|
| 2,785,277 A * | 3/1957 | Jepson | 219/442 |
| 3,736,861 A * | 6/1973 | Kroyer et al. | 99/343 |
| 5,265,522 A * | 11/1993 | Schultz | 99/343 |
| 6,274,847 B1 | 8/2001 | Hlava et al. | |
| 6,414,274 B1 | 7/2002 | Mahyari | |
| 6,578,469 B2 * | 6/2003 | Sharpe | 99/342 |
| 6,872,921 B1 * | 3/2005 | DeCobert et al. | 219/441 |
| 7,109,445 B2 | 9/2006 | Patterson et al. | |
| 7,291,812 B2 | 11/2007 | Kaney et al. | |
| 7,605,349 B2 | 10/2009 | Gaynor et al. | |
| 7,820,947 B2 | 10/2010 | Gaynor et al. | |
| 2003/0173352 A1 * | 9/2003 | Patterson et al. | 219/494 |
| 2005/0145633 A1 | 7/2005 | Goto et al. | |
| 2007/0221651 A1 | 9/2007 | Kristina et al. | |
| 2008/0083730 A1 | 4/2008 | Dolgov et al. | |
| 2008/0257166 A1 | 10/2008 | Peng | |
| 2009/0039071 A1 | 2/2009 | Tynes et al. | |
| 2009/0039073 A1 | 2/2009 | Guo et al. | |
| 2009/0272749 A1 * | 11/2009 | Romandy et al. | 220/573.1 |

* cited by examiner

*Primary Examiner* — Steven Leff
(74) *Attorney, Agent, or Firm* — Michael J. Corrigan

(57) ABSTRACT

A slow cooker having a thermometer such as a capillary thermometer and a graphic display device for indicating a temperature condition of the food product contained within the cooking vessel, the thermometer measuring the temperature of an outer surface of the cooking vessel and the graphic display device displaying the temperature measured by the thermometer but adjusted by a correlation factor to indicate at least an approximate temperature of the food product within the cooking vessel.

20 Claims, 7 Drawing Sheets

SLOW COOKER WITH THERMOMETER FOR INDICATING A TEMPERATURE CONDITION OF THE FOOD IN THE COOKING VESSEL

CROSS-REFERENCE TO RELATED APPLICATION

This application claims the benefit of U.S. Provisional Patent Application Ser. No. 61/596,861 filed Feb. 9, 2012, the entire disclosure of which is incorporated herein by reference.

BACKGROUND OF THE INVENTION

Slow cooker appliances have been broadly used in households since at least the 1970's and are commonly used for a variety of purposes. Slow cookers are convenient ways to cook a wide variety of foods including, but not limited to, soups, stews, dips, chilis, roasts, and other large cuts of meat at a lower temperature for extended periods of time. One benefit of slow cookers is that a user may add all the ingredients for a meal, namely, the meat, starches, vegetables, and so forth, together into one appliance and it will "slow cook" during the day and be ready for consumption at dinner time. Many slow cookers only have a "cooking" setting and an "off" setting. Some slow cookers may include a "warm" setting however the "warm" setting often may only be activated after a pre-determined cooking cycle has been completed.

Often times, slow cookers are used at potluck dinners, family reunions, smaller restaurants/bars, parties or other applications for holding and serving food items for an extended period of time. In this situation, the slow cooker is often transported from the cooking location to the serving location. Further, these events often require the food to be made available for serving for prolonged periods of time. Once the desired food product has finished cooking in the slow cooker, it is desirable to keep the food product at a comfortable consuming temperature in the slow cooker, rather than at the "cooking" temperature. Unfortunately, as stated above, since most slow cookers only have a "cooking" setting and an "off" setting, keeping the food product at a comfortable consuming temperature is oftentimes problematic. Thus, to prevent the served food product in the slow cooker from (1) being too hot to eat, (2) burning or over cooking, or (3) drying out the contents due to boiling off of the liquid or moisture associated with the food product, most users often serve the food product with the slow cooker turned off. This situation presents other undesirable issues including not being able to control the serving temperature of the food product in the slow cooker.

Leaving a food product unheated for a prolonged period of time presents obvious risks. First, if food is left unheated too long, it may become too cold and will not be at an ideal consuming temperature. Second, if the temperature of the food product gets too low, bacteria may reappear and/or start to grow. Thus, to prevent the served food product from getting too cold so as to be unappetizing, or worse, harmful to the consumer, it is desirable to monitor the temperature of the contents of the food in the slow cooker. There is therefore a need for a slow cooker which provides users with some indication of the actual temperature of the food product inside the cooking vessel so that a user can selectively re-heat the food product, if necessary, to keep the food product at an optimal serving temperature. There is also a need for a slow cooker that incorporates a heat sensor and/or thermometer combined with a visual/graphic indicator which will allow a user to monitor the temperature of the food product inside the cooking vessel after cooking and while the food product is being served.

SUMMARY OF THE INVENTION

The present invention teaches the construction and operation of several embodiments of a slow cooker that incorporates a thermometer for providing a visual indicator of the food product temperature contained therein thereby allowing a user to monitor the temperature of the food contents inside the cooking vessel. The present slow cooker includes components associated with typical slow cookers including, but not limited to, a housing, a cooking vessel, a lid having a lid handle, a food temperature indicator display, an electronic control panel, a heating element controlled by the electronic controls, a power cord and a pair of handles extending from the slow cooker housing for transporting the slow cooker from one location to another. The slow cooker may also include a latch mechanism for securing the lid to the cooking vessel and to the housing.

In one embodiment, the present slow cooker may include an opening in the lid which may include a one-way valve that acts as a vent. The vent may release steam or vapor when the pressure inside the cooking vessel gets above a pre-determined limit. Alternatively, the opening may also allow for insertion of a temperature probe directly into the food contents being heated inside the cooking vessel. The present slow cooker may additionally include a pair of arms coupled to the outer surface of the housing, these arms being configured to allow the power cord to wrap therearound for stowing the power cord when not in use or during transport.

In one embodiment, the thermometer used with the present invention may be a capillary thermometer positioned under the cooking vessel. The capillary thermometer measures the actual temperature of the outer wall of the cooking vessel and uses an established correlation to estimate and display the approximate temperature of the food items inside the cooking vessel. Since the capillary thermometer measures the temperature of the cooking vessel, and not specifically the temperature of the food product therewithin, a temperature difference does exist between the measured cooking vessel temperature and the actual temperature of the food product contained therewithin. A correlation can be established to account for this differential in temperature between the actual temperature of the food product within the cooking vessel and the measured temperature of the cooking vessel. For example, this temperature differential can be established by experimental testing or other means such that the temperature displayed on the food temperature indicator represents at least an approximate temperature of the food contents inside the cooking vessel as will be hereinafter further explained.

The capillary thermometer may be positioned in a housing assembly located beneath the cooking vessel of the slow cooker. The housing assembly includes a top cap which may protrude through an opening in the bottom of the slow cooker housing so that the upper portion of the top cap is in direct contact with the bottom wall of the cooking vessel when the cooking vessel is positioned and seated in the housing. The upper portion of the top cap and the capillary thermometer disposed therein may be spring loaded to ensure that the upper portion of the top cap is always urged against the bottom wall of the cooking vessel. The capillary thermometer may be connected to a graphic offset display positioned in the control panel on the outside of the slow cooker housing. The graphic display is offset based upon the estimated correlation to account for the differential between the actual temperature of the food product inside the cooking vessel and the measured temperature of the exterior wall of the cooking vessel as sensed by the capillary thermometer. The food temperature indicator may indicate whether the food in the cooking vessel is hot, cool, or is in some range between hot and cool.

For example, one embodiment of the food temperature indicator display may have a dial which points to color coded degradations on the display face that signify whether the estimated food temperature is "cool" which may be represented by a yellow degradation, "hot" which may be represented by a red degradation, or a degradation, for example of a color between yellow and red, to represent a temperature between cool and hot. The food temperature indicator may be connected to the capillary thermometer via a tube associated with the capillary thermometer and housed within the housing assembly. The tube and capillary thermometer may be filled with a fluid that has a coefficient of expansion which results in the fluid expanding and contracting as the capillary thermometer is heated and cooled.

The expanding and contracting fluid within the capillary thermometer causes the fluid in the tube to flow back and forth inside the tube and, as it does so, the fluid urges against a spring biased dial indicator associated with the food temperature indicator display thereby causing the dial indicator to rotate to a color degradation corresponding to an approximate temperature of the food product within the cooking vessel. Thus, the approximate temperature of the food may be visually illustrated on the exterior of the slow cooker, i.e., cool, hot, or somewhere in between using the capillary thermometer and the food temperature indicator. One embodiment of the present invention includes a capillary thermometer and display requiring no power in order to measure and display the temperature of the food within the cooking vessel. As a result, the temperature of the food within the cooking vessel may be constantly measured and displayed despite the power cord of the slow cooker being disconnected from a power source.

The present cooking vessel may also include a sidewall that is thicker than the sidewall associated with typical cooking vessels of this type. This may be beneficial to prolong the heat retention of the food product within the cooking vessel.

Other aspects and advantages of the present invention will be apparent from the following detailed description of the several embodiments and the accompanying drawings.

BRIEF DESCRIPTION OF THE DRAWINGS

The accompanying drawings form a part of the specification and are to be read in conjunction therewith, in which like reference numerals are employed to indicate like or similar parts in the various views.

DETAILED DESCRIPTION OF THE INVENTION

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

Slow cooker appliances such as that disclosed herein include, but are not limited to, the slow cookers disclosed in U.S. Pat. Nos. 6,740,855; 6,587,739; and 7,312,425, all of which are incorporated herein by reference. The slow cooker of the present invention includes a thermometer which detects the temperature of the cooking vessel and relates that temperature to the temperature of the food product being cooked within the cooking vessel.

Figure 1:
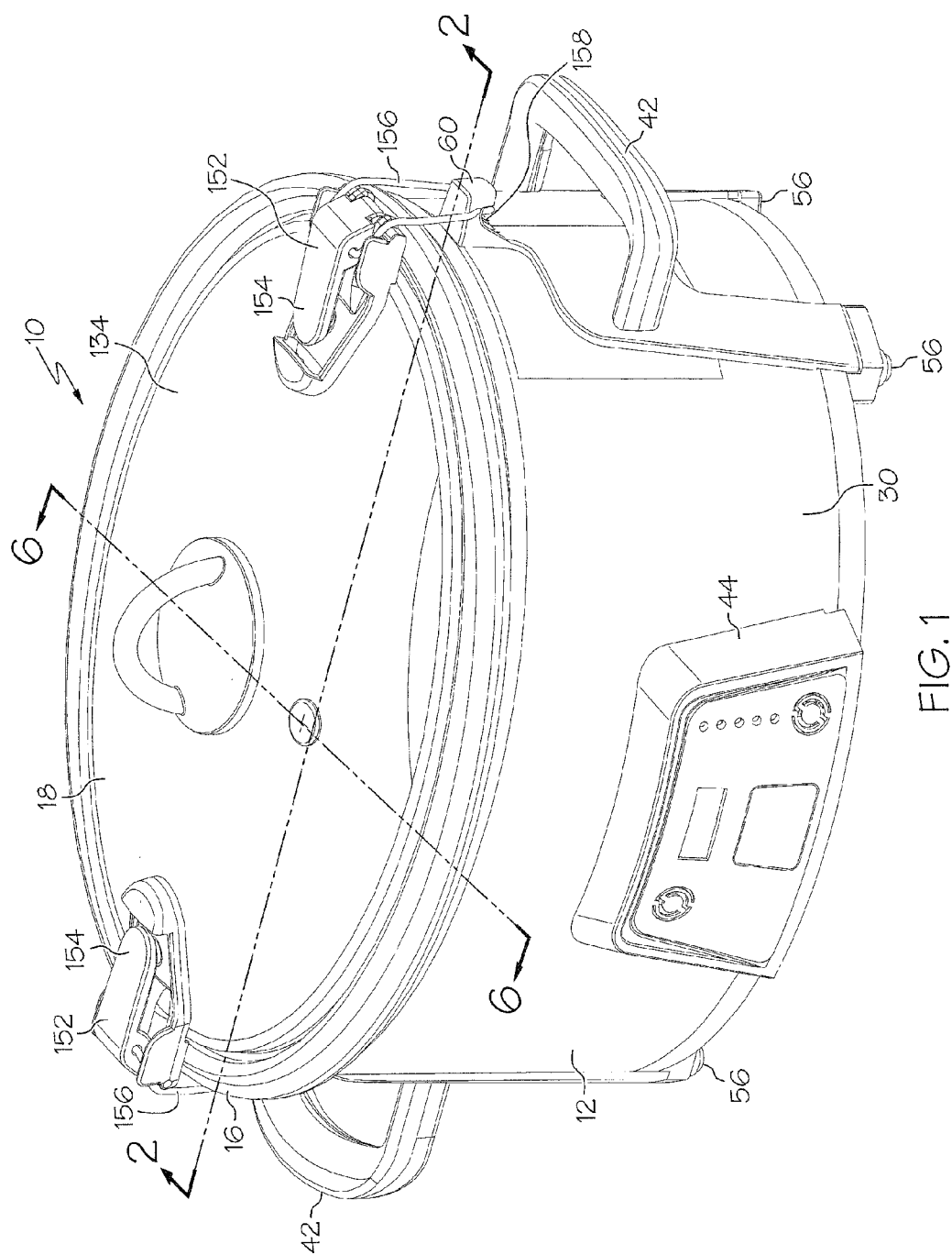
FIG. 1 is a perspective view of one embodiment of the present slow cooker constructed in accordance with the teachings of the present invention.
Figure 2:
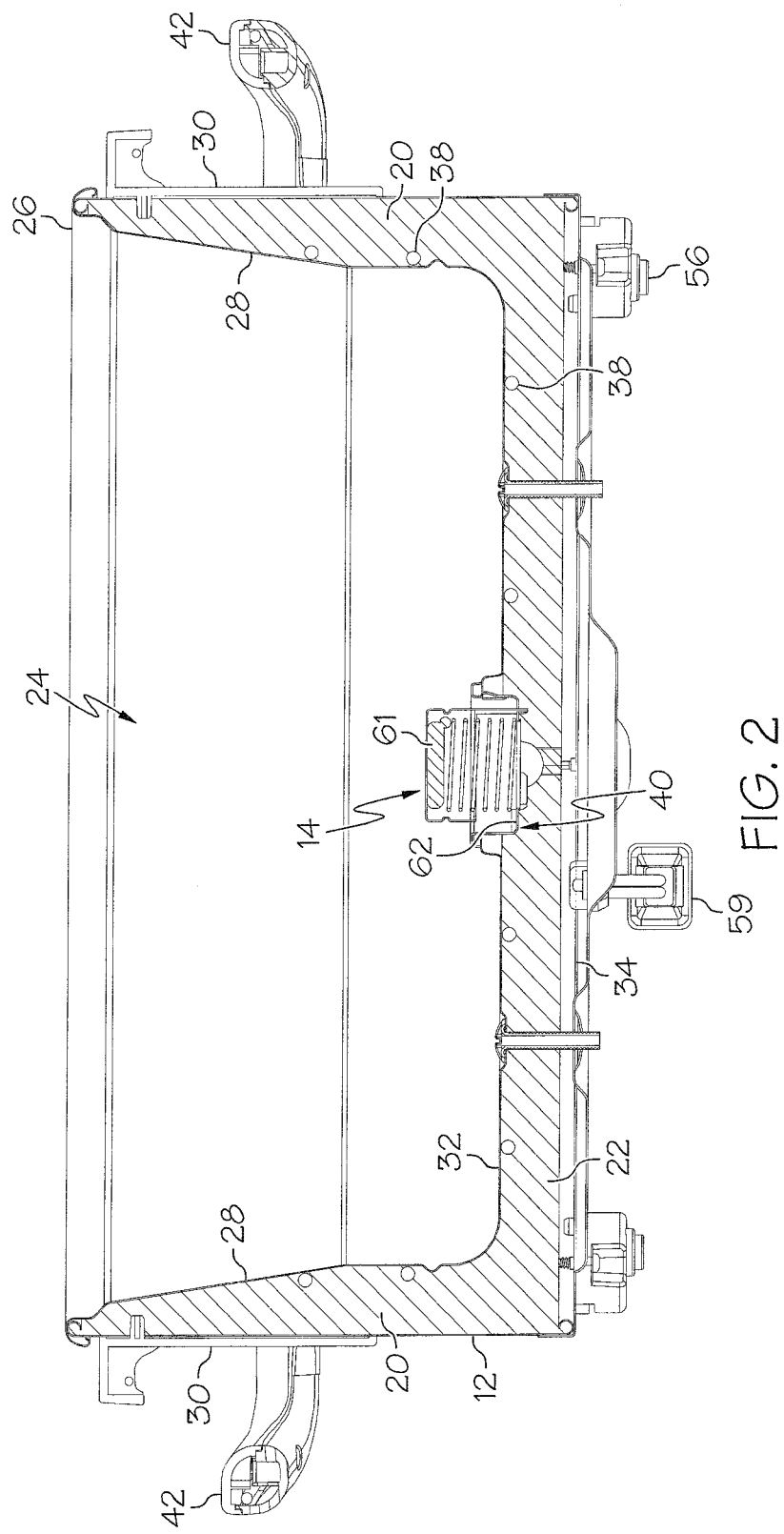
FIG. 2 is a cross-sectional view of the housing of the slow cooker of FIG. 1 taken along line 2-2 of FIG. 1.

Referring to FIG. 1, there is illustrated a slow cooker 10 including, but not limited to, a housing 12 having a thermometer 14 (see FIG. 2) operably disposed therein, a cooking vessel 16 seated within the housing 12, and a lid 18 configured to removably seat on and cover cooking vessel 16. As best shown in FIG. 2, housing 12 includes a sidewall 20, a bottom wall 22, and an open top 24 defined by a top annular rim 26. Sidewall 20 includes an inner wall 28 and an outer wall 30 defining a sidewall thickness therebetween. Bottom wall 22 includes a bottom inner wall 32 and a bottom outer wall 34 also defining a bottom thickness therebetween. Inner wall 28 of sidewall 20 and/or inner wall 32 of bottom wall 22 includes an opening or recess 40 defined therein for receiving the thermometer 14 therethrough or therewithin. Housing 12 further includes at least one heating element 38 positioned and located between inner walls 28 and 32 and outer walls 30 and 34 as shown.

Inner walls 28 and 32 may be comprised of a wide variety of materials including aluminum, stainless steel, copper, or any other known commercial alloy or other suitable material. Metal inner walls 28 and 32 are beneficial in transferring heat from housing 12 to the cooking vessel 16. Outer walls 30 and 34 may also be comprised of aluminum, stainless steel, copper, or any other known commercial alloy, glass, carbon fiber, composite, ceramic, or some temperature resistant plastics depending upon the amount of heat that is transferred to outer walls 30 and 34. The selection of the material of outer walls 30 and 34 may be made for both functional and aesthetic reasons. Other similar and functionally equivalent materials now known or hereafter developed may be used for both inner walls 28 and 32, and outer walls 30 and 34. Outer wall 30 of sidewall 20 may also include opposing handles 42 coupled thereto as shown in FIGS. 1 and 2.

Figure 3:
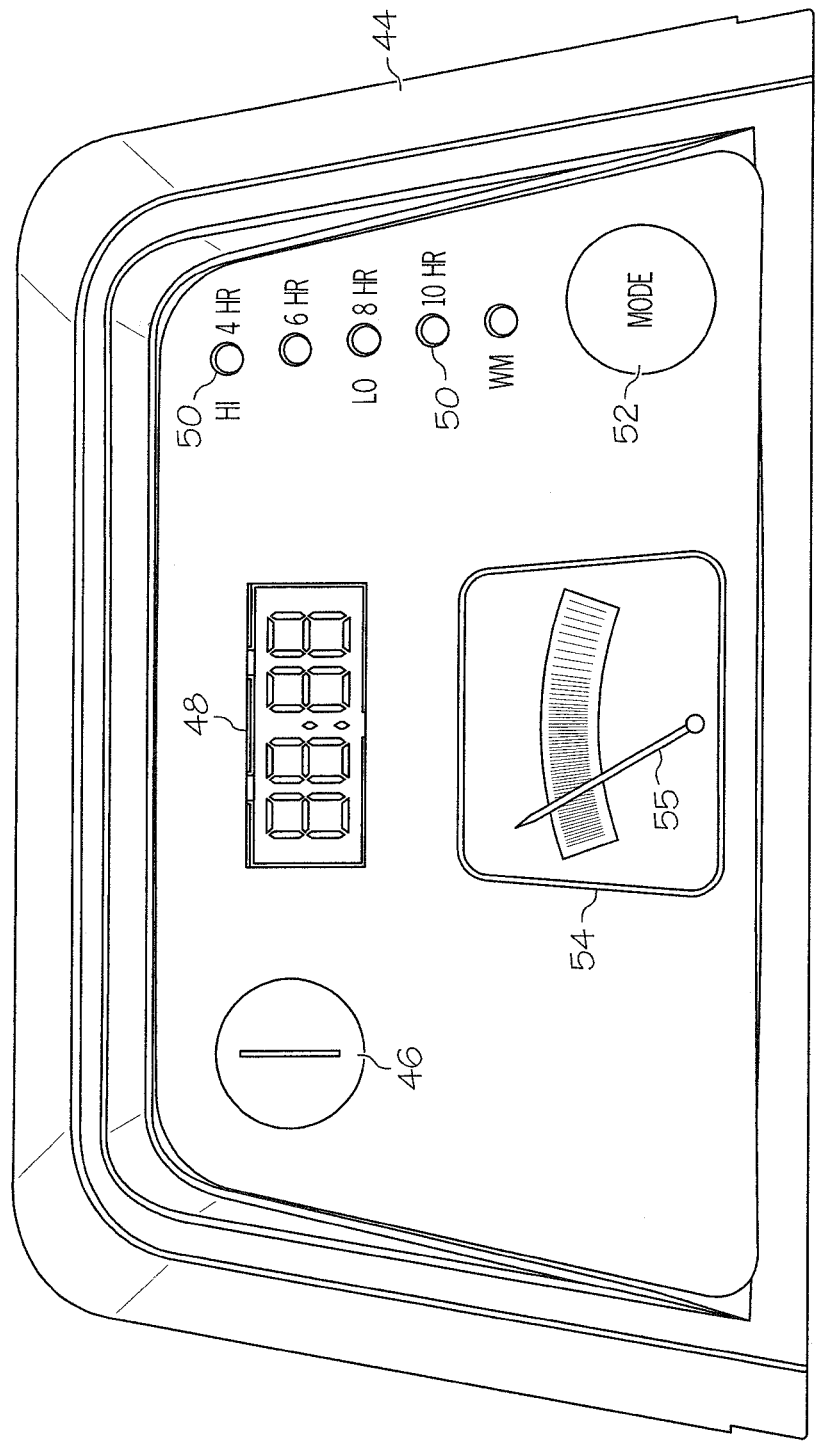
FIG. 3 is a front elevational view of one embodiment of a control panel associated with the present slow cooker constructed in accordance with the teachings of the present invention.
Figure 6:
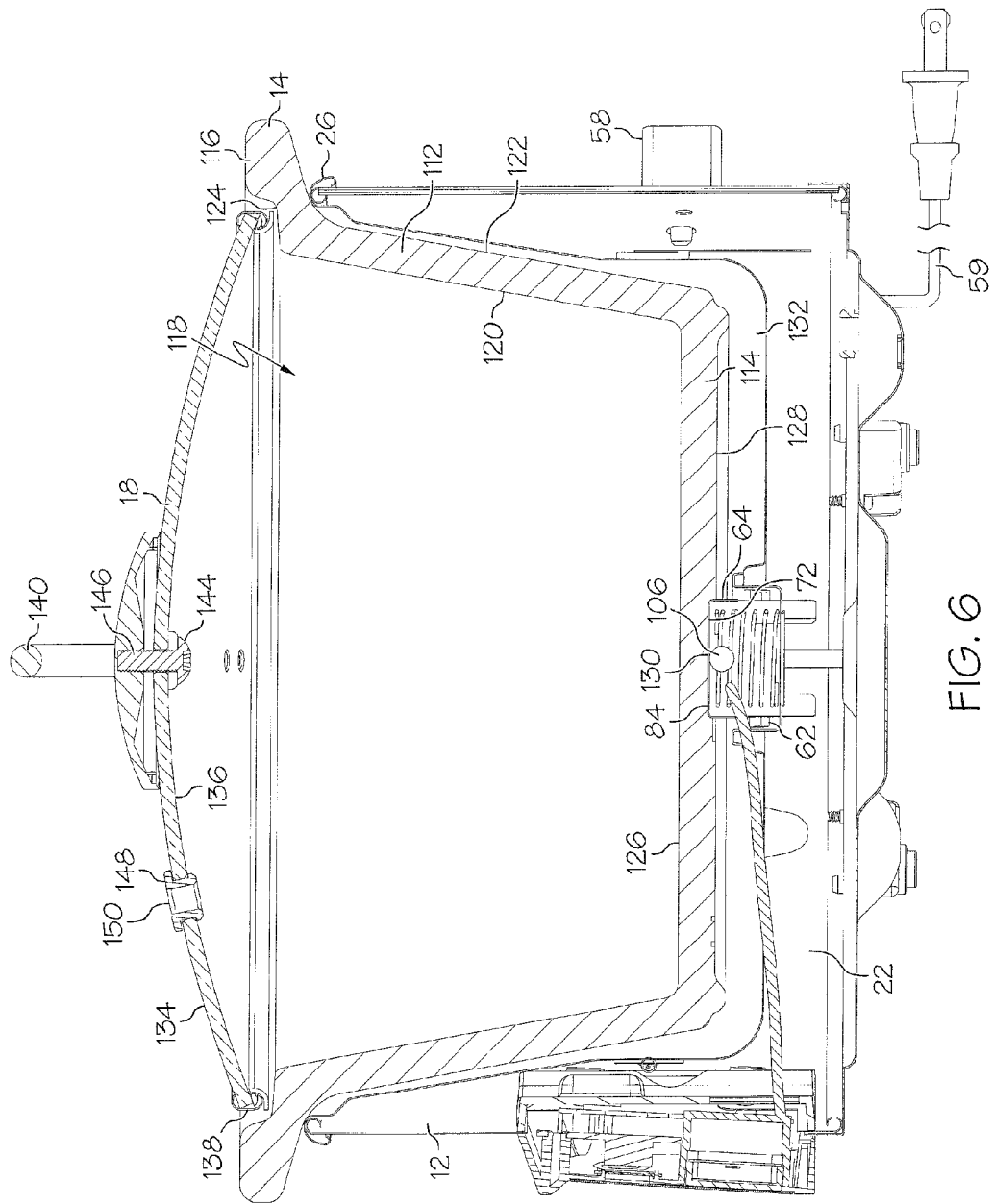
FIG. 6 is a cross-sectional view of the present slow cooker of FIG. 1 taken along the line 6-6 of FIG. 1.

Referring back to FIG. 1, a control panel 44 may be coupled to outer wall 30 as shown. FIG. 3 illustrates one embodiment of control panel 44 that includes a plurality of electronic controls including, but not limited to, one or more of the following: an on/off switch 46, a timer 48, a cooking mode indicator 50, a cooking mode switch 52, and a food temperature graphic display 54. Slow cooker 10 is generally a standard plug-in type electrical cooking device which includes a power cord 59 as best illustrated in FIG. 6. It is however also recognized and anticipated that slow cooker 10 could be configured to be alternatively powered by battery or some other power source. On/Off switch 46 turns slow cooker 10 on and off. Timer 48 may display the current time, the remaining cooking time, the actual cooking time, and/or other timer or clock features now known or hereafter developed.

Cooking mode indicator 50 displays which cooking mode or temperature range has been selected by a user through cooking mode switch 52. Common examples are: low, medium, high, or warm. As shown in FIG. 3, one embodiment includes indicators which are designated as "HI," "LO," and "WM." Alternatively, cooking mode indicator 50 may display an actual cooking temperature and/or time duration to be selected by the user. Cooking mode indicator 50 may also include an indication of cooking time ranges associated with each cooking temperature range. For example, in the embodiment illustrated in FIG. 3, control panel 44 may include a cooking mode indicator 50 that displays several operating times for each of the HI and LO settings such as preset times of 4 hours and 6 hours for the HI setting, and 8 hours and 10 hours for the LO setting. In one embodiment, slow cooker 10 may operate at a high temperature for about four (4) hours and then switch to a warming mode. One embodiment may also include a warming mode that is either (1) activated after the completion of the selected cooking mode and time duration, or (2) a separate setting chosen by the user. Still further, mode indicator 50 may be an LED or other light positioned next to the written description of the cooking mode, time or temperature. It is recognized and anticipated that still other settings may be used and any configuration of preset times and cooking temperatures may be incorporated into control panel 44 and slow cooker 10 and all such variations are intended to be within the scope of the present invention.

As best shown in FIGS. 1 and 2, housing 12 may also include a plurality of legs 56 extending away from bottom wall 22. Legs 56 may be integrally formed with bottom wall 22 or they may be coupled thereto using any known coupling or fastener means. One embodiment of housing 12 may include hooks 60 that are configured to engage a latch mechanism associated with lid 18 as will be further described below.

Figure 4:
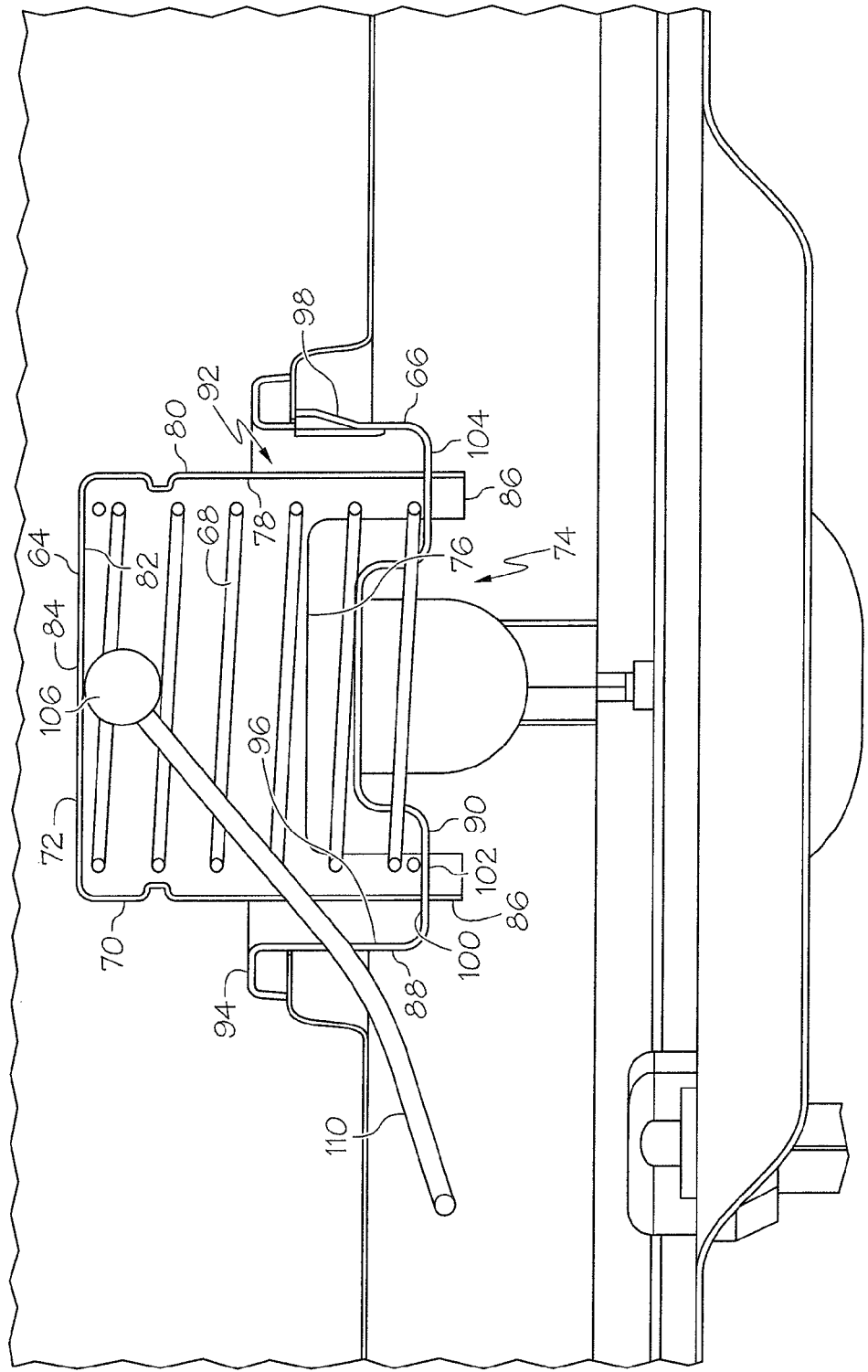
FIG. 4 is a cross-sectional view of one embodiment of a thermometer and a thermometer housing assembly constructed in accordance with the teachings of the present invention.

As best illustrated in FIGS. 2 and 4, housing 12 of slow cooker 10 includes a thermometer 14 having a temperature sensing device 61 positioned and located within a thermometer housing assembly 62 that is received into or extends through the housing recess or opening 40. As shown in FIG. 4, thermometer housing assembly 62 includes a top cap 64, a bottom cap 66 configured to receive top cap 64, and a spring member or other biasing member 68 operably positioned between top cap 64 and bottom cap 66. Top cap 64 further includes an annular sidewall 70, a top wall 72, and an open bottom 74 defined by a bottom rim 76 of sidewall 70. Sidewall 70 includes an inner surface 78 and an outer surface 80. Top wall 72 also includes a top inner surface 82 and a top outer surface 84 as shown. One embodiment of top cap 64 includes a plurality of legs 86 which extend downwardly away from rim 76, the legs 86 extending through corresponding openings or slots 104 in the bottom cap 66 for holding the top cap in operative position on the bottom cap.

Bottom cap 66 includes an annular sidewall 88, a bottom wall 90, and an open top 92 defined by top rim 94. Sidewall 88 includes an inner surface 96 and an outer surface 98. Bottom wall 90 includes a bottom inner surface 100 and a bottom outer surface 102. Bottom outer surface 102 may include one or more slots 104 therein, the slots 104 being complimentary to legs 86 of top cap 64. Legs 86 may pass through slots 104 and thereby function as a guide to properly orient the respective caps to each other and to prevent top cap 64 from rotating within bottom cap 66. Alternatively, top cap 64 may include other guiding mechanisms, such as pins, rods, grooves, projections or other similar structures (not shown) that engage bottom cap 66.

Figure 5:
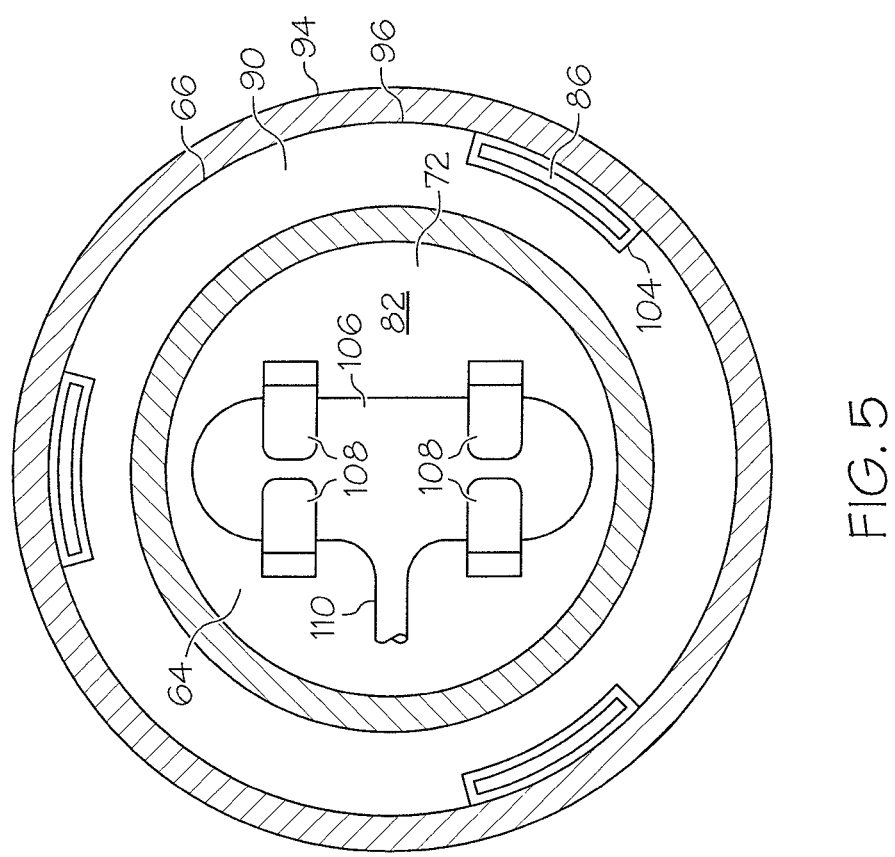
FIG. 5 is a bottom view of the thermometer and thermometer housing assembly of FIG. 4.

Although any temperature sensing device 61 (FIG. 2) can be used in the present invention to measure the temperature of the cooking vessel 16, as illustrated in FIGS. 4 and 5, a preferred embodiment of the temperature sensing device 61 includes a capillary thermometer having a capillary fluid reservoir 106 positioned against top inner surface 82 of top cap 64 as shown. Capillary fluid reservoir 106 may be coupled to the top wall 72 of top cap 64 using one or more mounting flanges 108 as shown in FIG. 5. The top wall 72 and the capillary fluid reservoir 106 are in thermal communication with each other and both are in thermal communication with the bottom surface of the cooking vessel as will be further explained. The capillary thermometer further includes a capillary tube 110 that is in fluid communication with both the capillary fluid reservoir 106 and the food temperature display 54 as will likewise be further explained.

Capillary fluid reservoir 106 and capillary tube 110 may contain any fluid now known or hereafter developed which expands and contracts when it is heated and cooled. In one embodiment of the present invention, tube 110 and capillary reservoir 106 are filled with kerosene which has a thermal coefficient of expansion of 0.00100/° F. Other suitable fluids having similar coefficients of expansion, such as ethyl alcohol or gasoline, may also be used. However, it shall be appreciated by a person of skill in the art that there are numerous configurations of the volume of fluid, diameter of tube, and sensitivity of food temperature display 54 that may be used to accurately and successfully measure the temperature of cooking vessel 16. The expanding and contracting fluid within the capillary thermometer causes the fluid in the tube 110 to flow back and forth inside the tube and as it does so the fluid urges against a spring-biased dial indicator 55 associated with food temperature display 54 so as to cause the dial indicator 55 to rotate to a color degradation or other scale parameter corresponding to at least an approximate temperature of the food product within the cooking vessel 16. This enables a user to at least visually determine what the approximate temperature of the food product is at all times, namely, hot, cool or somewhere in between. The accuracy of the correlation between the measured cooking vessel wall temperature and the actual temperature of the food contents therewithin will determine the accuracy of the estimated temperature of the food contents as discussed below. In another embodiment, the food temperature display 54 may be replaced with an electronic digital display having light emitting diodes to represent a color degradation or other scale parameter corresponding to at least an approximate temperature of the food product within the cooking vessel 16. A portable or replaceable power source such as batteries or other power means unrelated to the power source powering the slow cooker 10 such as power cord 59 can be utilized to power the electronic digital display 54 when the slow cooker 10 is unplugged and is being utilized in its serving mode.

Other temperature sensing devices 61 may also be used in place of a capillary thermometer, including a digital thermometer operating on conventional battery power or a rechargeable battery that charges while slow cooker 10 is plugged in, a liquid crystal thermometer, a temporal thermometer, a bi-metal mechanical thermometer, an alcohol thermometer, a resistance thermometer, a pyrometer, or any other temperature sensing device now known or hereafter developed. Generally, a capillary thermometer is preferred because it requires no power source whatsoever to display at least an approximate temperature of the food contents even when the slow cooker 10 is unplugged. The use of other temperature sensing devices as indicated above can be used so long as they can operate independent of the power source which powers the heating elements 38 associated with the slow cooker 10, or which operate on a power source separate and apart from the power cord 59. This enables a user to monitor the temperature of the food contents within the present slow cooker 10 during the serving mode without continuously heating the food contents.

As shown in FIG. 6, one embodiment of housing 12 may also include two or more opposing legs 58 coupled to outer wall 30 of sidewall 20 for allowing a power cord 59 to be wrapped around the legs 58 and stored thereon. Moreover, FIG. 6 illustrates a cooking vessel 16 including a sidewall 112, a bottom wall 114, and an annular rim 116 defining an open top 118. Sidewall 112 includes a sidewall inner surface 120 and a sidewall outer surface 122 defining a sidewall thickness therebetween. One embodiment of the present invention may include a cooking vessel 16 having a sidewall thickness that is greater than the sidewall thickness typically associated with cooking vessels used in the art. For example, one embodiment may include a sidewall thickness of about two-times the sidewall thickness of conventional slow cookers. An increase in sidewall thickness may reduce the rate at which the food contents within the cookware vessel 16 lose heat when no heat is being applied thereto by the heating element 38. Annular rim 116 may further include a ledge 124 defined therein which may be a recess associated with a portion of inner surface 118. Ledge 124 may be configured to receive and support lid 18 as shown and further described below.

Bottom wall 114 further includes a bottom inner surface 126 and a bottom outer surface 128 defining a bottom thickness therebetween. One embodiment of cooking vessel 16 may include a thermometer engagement zone 130 wherein a portion of engagement zone 130 may include a portion of bottom outer surface 128 being recessed to engage top cap 64. Alternatively, engagement zone 130 may be either flat or include a portion thereof projecting outwardly so as to be received by a complimentary recess associated with top cap 64. Further, in one embodiment, an air space 132 may be present between the inner walls 28 and 32 of housing 12 and the outer surfaces 122 and 128 of cooking vessel 16.

As further illustrated in FIG. 6, lid 18 includes an outer surface 134, an inner surface 136, an annular rim 138, and a handle 140. Annular rim 138 of lid 18 is configured to rest upon ledge 124 as shown. When annular rim 138 rests upon ledge 124, cooking vessel 16 is substantially enclosed thereby capturing heat and moisture which assist the cooking process.

Handle 140 may be coupled to or otherwise attached to the outer surface 134 of lid 18 through the use of a fastener 144 which passes through an aperture 146 extending through both inner surface 134 and outer surface 136 of lid 18 and which is received into handle 140 as shown. Another embodiment (not shown) may include a lid 18 having handle 140 integrally formed therewith.

Figure 7:
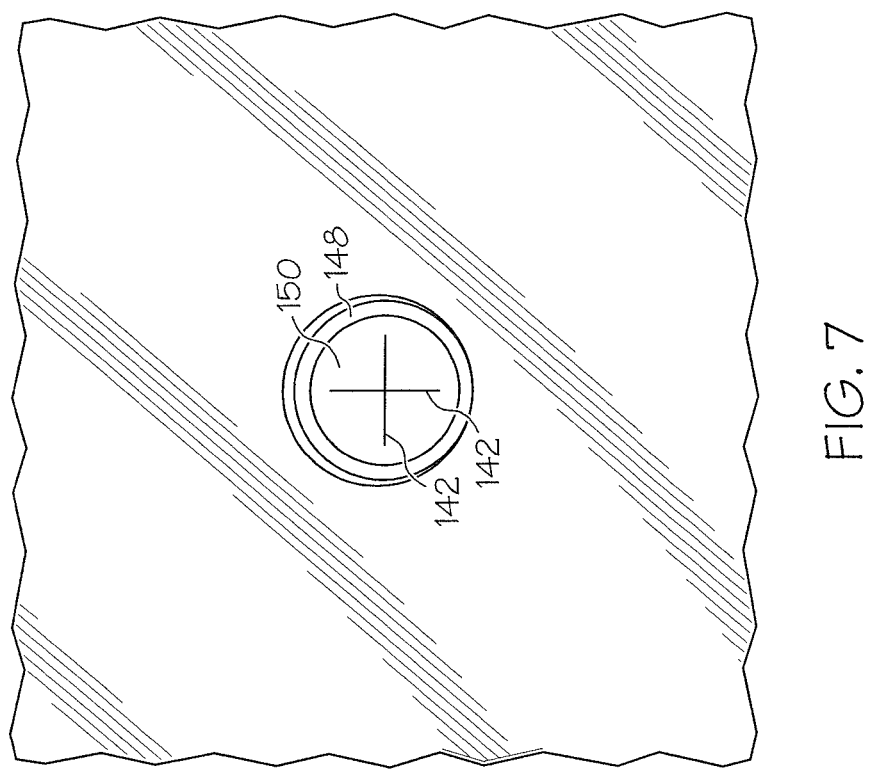
FIG. 7 is a partial top view of one embodiment of a vent in the lid of the present slow cooker constructed in accordance with the teachings of the present invention.

Lid 18 may further include a vent 148 as illustrated in FIG. 6. Vent 148 may be simply an opening (fixed or adjustable) for allowing vapor to escape therethrough during cooking, or for allowing a user to insert an instrument (not shown) such as a temperature probe or sensor to directly measure the temperature of the food contents within the cooking vessel 16 during cooking or during serving. Alternatively, vent 148 further includes an elastomeric membrane 150 that is configured to provide a barrier in lid 18 that allows pressure to escape out of the enclosed cooking vessel 16 during cooking when a predetermined pressure is reached, or otherwise. The membrane 150 can also be configured for allowing a user to insert an instrument (not shown) such as a temperature sensor (not shown) through vent 148. One embodiment of vent 148 is shown in FIG. 7. This embodiment includes vent 148 being configured to be a one-way valve allowing pressure to escape the enclosed cooking vessel 16. As shown, vent 148 may include membrane 150 having a pattern of slits 142 through membrane 150. Membrane 150 may be fabricated from a material and thickness wherein membrane 150 only displaces under a predetermined level of pressure thereby allowing one or more slits 142 to open and release pressure within enclosed cooking vessel 16 when the predetermine pressure level is reached. Alternatively, any type of vent 148 now known or hereafter developed may be used in concert with lid 18, including one-way or two way valves, or any other type of vent.

Lid 18 may further include at least one latch 152 as best illustrated in FIG. 1. FIG. 1 illustrates two latches 152 at opposing sides of lid 18 proximate annular rim 138. As shown, latches 152 may include a handle 154 and a loop 156 wherein loop 156 is configured to engage hooks 60 of housing 12 as shown. Loops 156 are secured within a recess 158 in hook 60 when handle 154 is in a raised position. As shown in FIG. 1, when handle 154 is levered downwardly, lid 18 is secured to cooking vessel 16 upon ledge 124 and both are secured to housing 12 as shown.

In use, a user will place the food items desired to be cooked in cooking vessel 16. The user may place the food items in cooking vessel 16 with cooking vessel 16 either inside or outside of housing 12. If the food items are placed in cooking vessel 16 outside housing 12, the user will nest cooking vessel 16 into housing 12 and housing 12 will receive cooking vessel 16 through the open top 24. In any event, when cooking vessel 16 is received into housing 12, rim 116 of cooking vessel 16 bears upon rim 26 of housing 12 thereby suspending cooking vessel 16 within housing 12. The weight of the cooking vessel 16 prevents it from being unwantingly removed from housing 12. Further, when cooking vessel 16 is received into housing 12, thermometer contact zone 130 of bottom wall surface 128 of cooking vessel 16 engages outer surface 84 of top wall 72 of top cap 64 as shown in FIG. 6. As a result, capillary fluid reservoir 106 is in thermal communication with bottom surface 128 of cooking vessel 16.

In one embodiment, a user will use on/off switch 46 to turn the slow cooker on and employ cooking mode switch 52 to select a cooking temperature and a cooking time. The food product will cook at the preset cooking temperature for the preset cooking time. During the cooking stage, the fluid within capillary fluid reservoir 106 will heat up and expand thereby exerting a pressure upon the spring dial 55 of food temperature indicator 54 resulting in a visual temperature indication of "hot."

If a user desires to serve the food items contained inside the slow cooker 10, the slow cooker 10 can be unplugged and moved to another location for serving, or the on/off switch can simply be turned off. While unplugged or in its off condition, the fluid within the capillary fluid reservoir 106 will continue to measure the temperature of the bottom wall surface 128 of cooking vessel 16. Once heating has stopped, either by turning the slow cooker 10 off or unplugging it, thermometer 14 will provide the user with at least an estimated or approximate indication of the temperature of the food contents in cooking vessel 16.

Thermometer 14 measures the actual temperature of the exterior of cooking vessel 16 at a specific wall location for furthering estimating and displaying the approximate food temperature inside cooking vessel 16. Capillary thermometer 14 is connected to a food temperature indicator 54 positioned in control panel 44 or elsewhere on the front of the slow cooker housing 12. Food temperature indicator 54 indicates whether the food in cooking vessel 16 is hot, cool, or is in some range between hot and cool. This information is useful for determining whether the food inside cooking vessel 16 has cooled such that re-heating may be warranted. Food temperature indicator 54 is calibrated to account for the differential between the actual temperature of the food product within the cooking vessel 16 and the measured temperature on the exterior 122 and/or 128 of cooking vessel 16 as measured by the capillary thermometer 14. The relationship between the temperature of the food product at the center of cooking vessel 16 and the exterior surface 122 or 128 of cooking vessel 16 can be experimentally observed and obtained as set forth in Table 1 below.

Thus, the approximate temperature of the food product within vessel 16 may be visually determined at all times during the serving process, that is, cool, hot, or somewhere in between. If food temperature dial 55 moves toward the "cool" end of the dial, a user may then plug-in or otherwise turn-on heating elements 38 of housing 12 to re-heat the food contents. Thus, a user will always have a visual indicator of the temperature of the food contents using slow cooker 10 of the present invention.

Although it is preferred that the thermometer 14 be a capillary thermometer as disclosed above and illustrated in FIGS. 4 and 6, it is recognized that other types of thermometers as discussed above can likewise be utilized in the present invention so long as the thermometer is able to read and correlate at least an approximate temperature of the food product being cooked within the cooking vessel 16 when the slow cooker 10 is disconnected from its power source. In those instances where the thermometer requires a power source, a portable or replaceable power source such as batteries or other power means unrelated to the power source powering the slow

TABLE 1

Temperature of Bottom of Cooking Vessel and Center of Stoneware Vessel versus Time After the Heat Source Has Been Removed.

| Time After Heat Removed (minutes) | Temperature of Bottom Surface of Stoneware Cooking Vessel (° C.) | Temperature of Center of Stoneware Vessel (° C.) | Difference (° C.) |
|---|---|---|---|
| 0 | 120.0 | 100 | −20 |
| 10 | 104.0 | 100 | −4 |
| 20 | 89.0 | 97.7 | 8.7 |
| 30 (1/2 hr) | 82.0 | 94.8 | 12.8 |
| 40 | 80.0 | 91.9 | 11.9 |
| 50 | 78.0 | 89.7 | 11.7 |
| 60 (1 hr) | 76.0 | 87.3 | 11.3 |
| 70 | 73.0 | 85.0 | 12.0 |
| 80 | 70. | 82.9 | 12.9 |
| 90 (1½ hrs) | 69.0 | 81.4 | 12.4 |
| 100 | 68.0 | 79.1 | 11.1 |
| 110 | 67.0 | 77.3 | 10.4 |
| 120 (2 hrs) | 66.0 | 75.4 | 9.4 |
| 130 | 65.0 | 73.5 | 8.5 |
| 140 | 63.0 | 72.9 | 9.9 |
| 150 (2½ hrs) | 62.0 | 71.3 | 9.3 |
| 160 | 61.0 | 70.1 | 9.1 |
| 170 | 60.0 | 68.8 | 8.8 |
| 180 (3 hrs) | 59.0 | 67.9 | 8.9 |
| 190 | 58.0 | 66.6 | 8.6 |
| 200 | 57.0 | 65.5 | 8.5 |
| 210 (3½ hrs) | 56.0 | 64.3 | 8.3 |
| 220 | 55.0 | 63.0 | 8.0 |
| 230 | 54.0 | 62.0 | 8.0 |
| 240 (4 hrs) | 53.0 | 60.7 | 7.7 |
| | | Average | 8.17 |

Experimental values of the temperature differential between the actual temperature of the food within cooking vessel 16 and the measured temperature of bottom wall 128 of cooking vessel 16 after heating elements 38 were turned off are shown in Table 1 above. For example, after the first ten minutes, the temperature differential between the actual temperature of the food within cooking vessel 16 and the measured temperature on exterior surface 128 of cooking vessel 16 was 4° C. After four (4) hours with no heat applied to the cooking vessel 16, the temperature differential was mostly in a range between about 8° C. to about 13° C. with the average temperature differential being around 8.2° C. As such, a correlation temperature offset of 8° C. (correlation factor) could be used to calibrate the dial indicator 55 to the approximate temperature of food product within the cooking vessel 16.

cooker 10 such as power cord 59 can be utilized to power the thermometer 14 when the slow cooker 10 is unplugged and is being utilized in its serving mode. It is also recognized and anticipated that other fluids besides kerosene can be utilized with a capillary thermometer as discussed above. Still further, it is also recognized and anticipated that the overall dimensions of the present slow cooker 10 including the thermometer 14, the housing assembly 62, and the overall configuration of the temperature sensing device 61 as well as the specific shape and configuration of these members are subject to wide variations and may be sized and shaped into a wide variety of different sizes and configurations so as to be compatible with the size and shape of a particular slow cooker assembly, or to conform with any space limitations associated therewith. Other variations and modifications to the various components comprising the present structures are also contemplated.

Thus, there has been shown and described several embodiments of a novel slow cooker with a thermometer for indicating a temperature condition of the food product contained in the cooking vessel, which slow cooker fulfills all of the objects and advantages sought therefor. Many changes, modifications, variations and other uses and applications of the present invention will, however, become apparent to those skilled in the art after considering this specification and the accompanying drawings. All such drawings, modifications, variations and other uses and applications which do not depart from the spirit and scope of the present invention are deemed to be covered by the present invention which is limited only by the claims which follow.

What is claimed is:

1. A slow cooker comprising:
    a housing;
    a cooking vessel having an inner and outer surface, said cooking vessel being configured to be removably nestable within said housing;
    a lid configured to removably cover said cooking vessel;
    a heating element powered by a power source for heating a food product positioned within the cooking vessel;
    a capillary thermometer coupled to said housing and in thermal communication with an outer surface of said cooking vessel when said cooking vessel nests within said housing, wherein said capillary thermometer includes a housing assembly having a to cap, a bottom cap, and a biasing member disposed therebetween for urging said top cap away from said bottom cap, said top cap including a top wall in thermal communication with said temperature sensing device; and
    a graphic display device for indicating a temperature condition of the food product contained within the cooking vessel, the thermometer measuring the temperature of an outer surface of the cooking vessel and the graphic display device displaying the temperature measured by the thermometer but adjusted by a correlation factor to indicate at least an approximate temperature of the food product within the cooking vessel.

2. The slow cooker of claim 1 wherein said thermometer includes a temperature sensing device having at least a portion thereof biased against the outer surface of said cooking vessel.

3. The slow cooker of claim 2 wherein said temperature sensing device and said graphic display device are operable separate and apart from the power source powering said heating element.

4. The slow cooker of claim 2 wherein said temperature sensing device is a capillary thermometer.

5. The slow cooker of claim 1 wherein the outer surface of said cooking vessel bears against the top wall of said top cap when said cooking vessel nests within said housing, and wherein said biasing member applies a resistive force to said top cap to ensure that the top wall of said top cap is at all times in thermal communication with the outer surface of said cooking vessel.

6. The slow cooker of claim 5 wherein said housing assembly includes a guide mechanism to prevent relative rotation between said top cap and said bottom cap.

7. The slow cooker of claim 1 wherein said lid includes a vent.

8. The slow cooker of claim 7 wherein said vent is a one-way valve configured to release pressure within said cooking vessel during cooking.

9. The slow cooker of claim 8 wherein said vent includes an elastomeric membrane having one or more slits extending therethrough, said membrane configured to displace under pressure such that one or more slits will open when a predetermined pressure force is reached within the cooking vessel.

10. The slow cooker of claim 7 wherein said vent is configured to allow an instrument to be inserted into said cooking vessel.

11. The slow cooker of claim 1 further including at least two arms coupled to said housing, said at least two arms configured such that a power cord associated with the slow cooker for providing power to the heating element may be wrapped around said at least two arms for storage or transport.

12. The slow cooker of claim 1, wherein the display device is a digital display device.

13. A slow cooker comprising:
    a cooking vessel having an outer surface and configured to hold one or more food items for slow cooking;
    a housing configured to receive said cooking vessel and having a bottom wall, a sidewall and an open top defined by a top rim;
    a heating element disposed within said housing for heating the food items within said cooking vessel;
    a control panel coupled to the sidewall of said housing, said control panel including at least a food temperature indicator and an on-off switch to selectively apply power to said heating element from a power source;
    a capillary thermometer positioned adjacent to one of the walls of said housing and operably coupled to said food temperature indicator, said capillary thermometer including a capillary fluid reservoir and a tube, said tube being in fluid communication with said capillary fluid reservoir and said food temperature indicator, said capillary fluid reservoir and said tube holding a fluid; and
    a lid configured to removably cover said cooking vessel;
    wherein said capillary fluid reservoir is in thermal communication with the outer surface of said cooking vessel when said cooking vessel is received within said housing, and wherein expansion and contraction of the fluid within the capillary fluid reservoir and said tube as the fluid reservoir is heated and cooled measures the temperature of the outer surface of the cooking vessel; and
    wherein said food temperature indicator is calibrated to display an adjusted temperature measured by the capillary thermometer to indicate at least an approximate temperature of the food items within the cooking vessel.

14. The slow cooker of claim 13 wherein said capillary fluid reservoir is biased into thermal communication with the outer surface of said cooking vessel.

15. The slow cooker of claim 13 wherein said lid includes a vent.

16. The slow cooker of claim 14 wherein said vent is a one-way valve configured to release pressure within said cooking vessel during cooking.

17. The slow cooker of claim 15 wherein said vent includes an elastomeric membrane having one or more slits extending therethrough, said membrane configured to displace under pressure such that one or more slits will open when a predetermined pressure force is reached within the cooking vessel.

18. The slow cooker of claim 15 wherein said vent is configured to allow an instrument to be inserted into said cooking vessel.

19. The slow cooker of claim 13 further including at least a pair of arm members coupled to the sidewall of said housing, said at least pair of arm members being configured such that a power cord associated with the slow cooker for providing power to the heating element may be wrapped around said at least pair of arm members for storage or transport.

20. A slow cooker comprising:
- a housing having a bottom wall, a sidewall, and an open top defined by a top rim;
- a control panel coupled to the sidewall of said housing, said control panel including at least an on-off switch and a food temperature display indicator;
- a heating element coupled to said housing and in electronic communication with said on-off switch;
- a capillary thermometer operably coupled to said food temperature display indicator and including a capillary fluid reservoir and a tube in fluid communication with both said capillary fluid reservoir and said food temperature display indicator;
- said capillary thermometer including a top cap, a bottom cap, and a spring member disposed therebetween, said top cap including a thermally conductive top wall positioned in thermal communication with said capillary fluid reservoir;
- a cooking vessel for holding and cooking a food item in said cooking vessel, said cooking vessel having a bottom wall, a sidewall, and a top rim and being configured to removably nest within said housing, wherein the bottom wall of said cooking vessel lies in thermal communication with the top wall of said top cap when said cooking vessel is nested within said housing thereby placing said capillary fluid reservoir in thermal communication with the bottom wall of said cooking vessel, said spring member biasing said top wall against the bottom wall of said cooking vessel; and a lid configured to removably cover said cooking vessel;
- said capillary fluid reservoir and said tube holding a fluid having a thermal coefficient of expansion for allowing said fluid to expand and contract during changes in temperature and wherein the expansion and contraction of said fluid acts on said food temperature display indicator to display a temperature, said food temperature display indicator being correlated to display a temperature representative of the temperature of the food items contained within the cooking vessel.

* * * * *